United States Patent
Hojo

[15] 3,644,709
[45] Feb. 22, 1972

[54] AUTOMATIC WARMER

[72] Inventor: Mitsuo Hojo, 3-134, 7-chome Kamikakihana-machi, Higashisumiyoshi-ku, Osaka, Japan

[22] Filed: Apr. 30, 1970

[21] Appl. No.: 33,354

[52] U.S. Cl. ............................219/439, 219/430, 219/441, 219/524, 219/530
[51] Int. Cl. ..............................................F27d 11/02
[58] Field of Search ..................219/524–525, 439–442, 219/430–431, 530, 540, 435–436

[56] References Cited

UNITED STATES PATENTS

| 1,946,220 | 2/1934 | Lotz | 219/440 |
| 2,096,873 | 10/1937 | Barnes | 219/436 |
| 2,923,803 | 2/1960 | Kueser | 219/441 |
| 2,990,286 | 6/1961 | Clarke et al. | 219/441 X |

FOREIGN PATENTS OR APPLICATIONS

| 455,145 | 1/1928 | Germany | 219/439 |
| 927,988 | 5/1947 | France | 219/525 |
| 666,637 | 10/1938 | Germany | 219/524 |

*Primary Examiner*—Volodymyr Y. Mayewsky
*Attorney*—Holcombe, Wetherill & Brisebois

[57] ABSTRACT

Warming pan comprising heating elements positioned to heat contents by radiation in addition to heating pan itself by conduction.

1 Claims, 3 Drawing Figures

3,644,709

AUTOMATIC WARMER

SUMMARY OF THE INVENTION

This invention relates to automatic warming pans.

The primary object of the present invention is to provide an automatic warming pan which utilizes electric heat most effectively by improving the arrangement of the electric heating element and the structure of the pan body.

In conventional automatic warming pans which have the electric heating element and a thermostat in the lid, the lid is heated first and subsequently the food to be heated in the warmer is heated by radiation from above. In this case, the food to be heated often includes such items as rice, barley and spaghetti. Since they produce considerable steam and have poor heat conductivity, they become unpalatable and the heating efficiency is not very high.

Other objects and advantages of the present invention will be better understood after reading the following detailed description accompanying drawings of two embodiments of the invention, with reference to the accompanying drawings, in which:

FIG. 4 is a diametral vertical section taken through a second embodiment of this invention.

Figure 1:
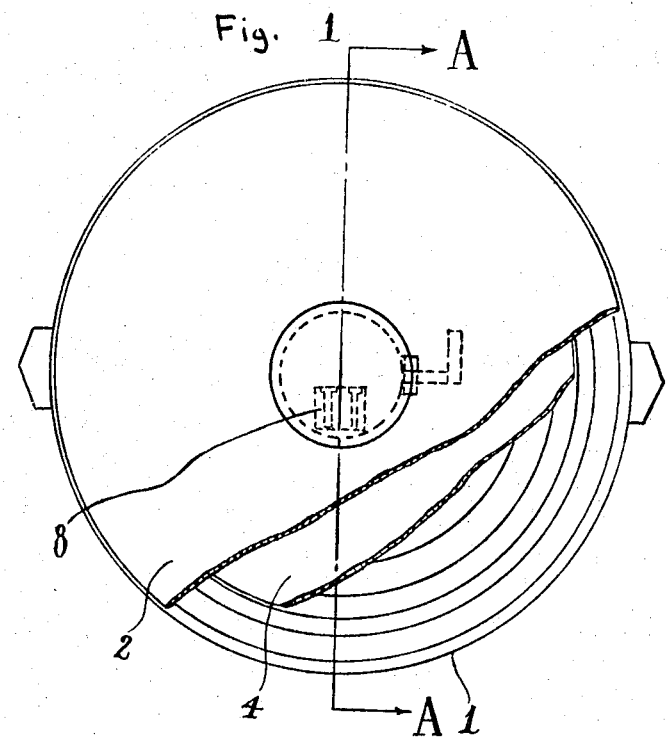
FIG. 1 is a plan view showing a first embodiment of the warming pan according to the invention.
Figure 2:
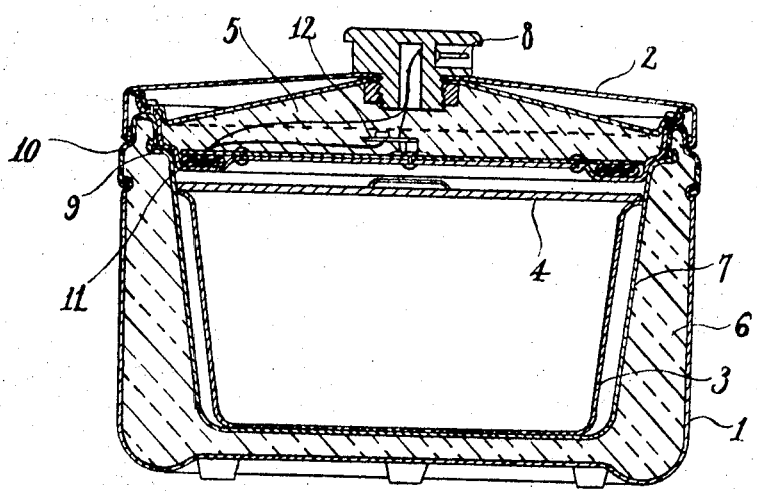
FIG. 2 is a vertical section taken along the line A—A of FIG. 1.

The first embodiment of this invention will now be described with reference to FIGS. 1 and 2. The inner wall 7 of the container 1 is made of a light metal which is a good conductor of heat. A heat-insulating material 6 is packed between the inner and outer walls of the container 1. The upper part of the inner wall is bent outwardly to form a ledge 9, which receives the lid. The part 10 between the ledge 9 formed at the top of the outer wall of the container and the upper part of the inner wall of the container is covered by a ring made of a plastic material such as ethylene tetrafluoride which is a poor heat conductor and heat resistant. The lid 2 is also hollow and filled with the heat-insulating material 5. The annular electric heating element 11 covered by insulating material, is positioned between the bottom of the lid near its outer rim and the heat-conducting ring which is fixed to the bottom of the lid made of light metal. The edge of this heat-conducting ring rests on the ledge 9 and ring 10 which is made of a plastic material.

In this figure, reference numeral 3 indicates an inner vessel, and 4 indicates a lid for that inner vessel. Reference numeral 8 indicates an electrical prong and 12 a thermostat which is connected in the electric wire between the prong and the annular electrical heating element.

According to the first embodiment, when the inner vessel contains food to be heated such as rice, barley and spaghetti, and the lid is placed on the vessel, this lid carries the heat-conductive ring. If the plug 15 is then connected to a source of electricity, the annular electrical heating element 11 produces heat, and the heat-conductive ring is heated to about 60° C. Food to be heated in the inner vessel is heated by radiant heat from the lid. At the same time, the heat of the heat-conductive ring is conducted to the ledge 9 of the container 1 and subsequently to the whole container 1. In this way, as the food to be heated is heated from every direction, it promptly reaches the prescribed temperature by heating from both top and bottom. Unlike conventional warmers, there is no inequality in heating rate between the upper part and the lower part. Nor is there any partial inequality such that the upper part of the food to be heated is dry and the lower part is wet. Moreover, since the heat in the container 1 and heat conductive ring 7 is prevented from radiating outwardly by the annular insulating rim 10, the electric heat can be effectively utilized.

Figure 3:
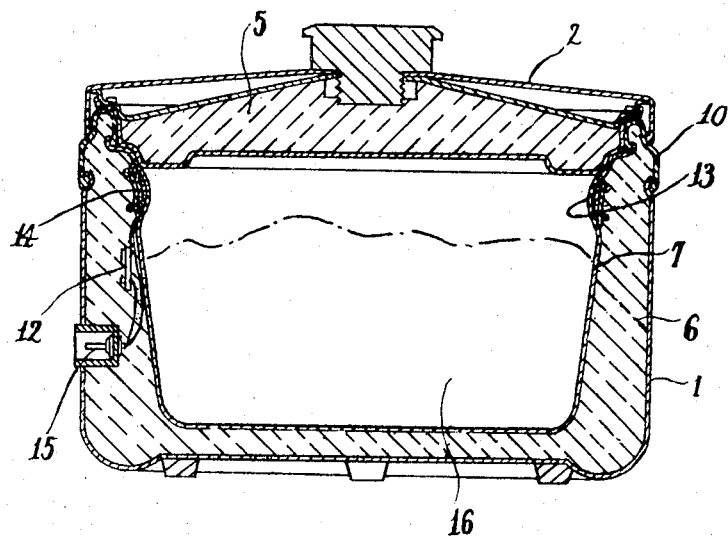

The second embodiment of this invention will now be described. As shown in FIG. 3, the heat-insulating material 6 is packed between the inner wall 7 and the outer wall of the container. The inner wall 7 is made of a light metal and is formed with an inwardly projecting annular ridge 13 near the top thereof. An annular electrical heating element 14 is in contact with the radially outer surface of the annular ridge, between the inner and outer walls of the container. The lead wire to the above electrical heating element 14 is connected across a thermostat 12 in the container wall. The lid is packed with heat-insulating material and rests on the annular rim member 10, which is made of a heat-insulating material.

In FIG. 3, reference numeral 16, shows the food to be heated such as rice, barley and spaghetti.

According to this second embodiment, the food 16 to be heated is placed inside of container 1. Subsequently, after setting the lid 2 on the container 1, the plug is connected to the source of electricity. Since the annular electric heating element 14 is in contact with the radially outer surface of the annular ridge near the top of the inner wall 7, the heat produced by the annular heating element 14 heats the whole inner wall very effectively and next heats that part of the food to be heated which is close to the inner wall by conduction. Since the annular ridge 13 which is heated most strongly by the heating element 14 projects inwardly, radiant heat radiates to the center, upper and lower parts of the inner wall and directly heats the upper part of the food to be heated. Therefore, the partial cooling of the food to be heated can be prevented and this food can be kept warm very efficiently. There is also a tendency to prevent the formation of steam. Part of the radiant heat is reflected from the bottom of the cover and assists in heating the upper part of the food to be heated.

What is claimed is:

1. A warming pan having a cover, both said pan and cover comprising inner and outer walls spaced by an insulating layer, said inner walls being made of a material which is a good conductor of heat, an annular electric heating element adjacent the peripheral portion of the inner wall of said cover and secured thereto, a heat-conducting ring carried by said cover in heat exchange relationship with said heating element, and in heat exchange relationship with the inner wall of said pan when closed by said cover, and a heat-insulating ring extending along the rim of said pan outside said heat conductive ring to form a heat seal between said pan and cover.

* * * * *